Aug. 19, 1924.
D. C. TEETOR
RECIPROCATING MECHANISM
Filed Aug. 23, 1922
1,505,749
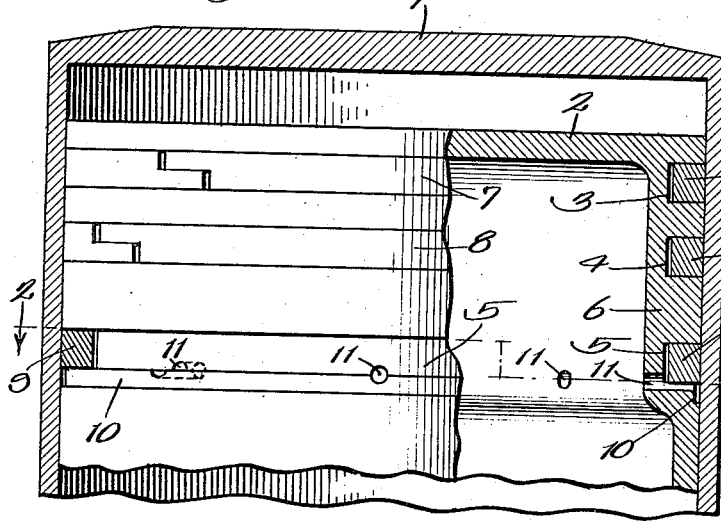
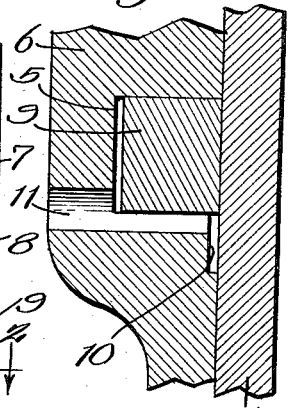
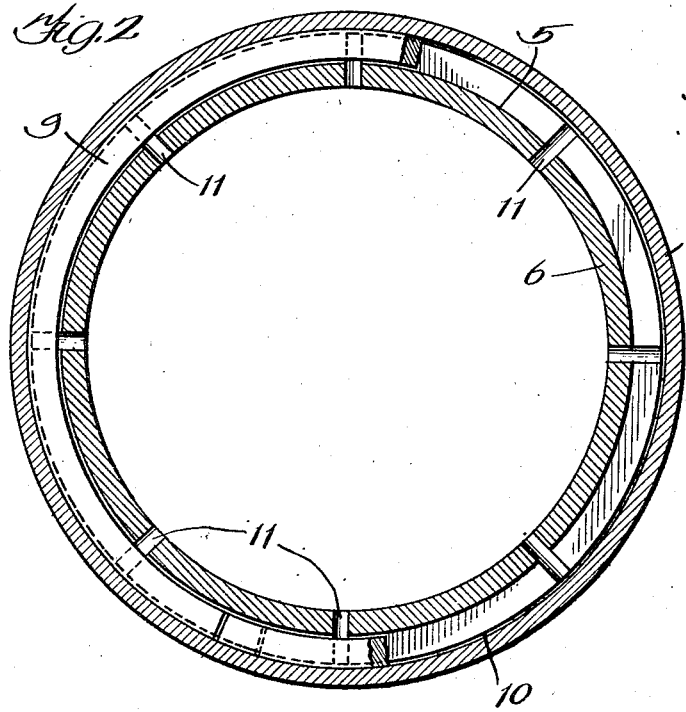
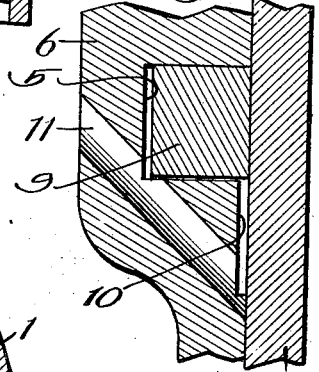
Inventor:
Daniel C. Teetor Patented Aug. 19, 1924.

1,505,749

UNITED STATES PATENT OFFICE.

DANIEL C. TEETOR, OF INDIANAPOLIS, INDIANA.

RECIPROCATING MECHANISM.

Application filed August 23, 1922. Serial No. 583,728.

*To all whom it may concern:*

Be it known that I, DANIEL C. TEETOR, a citizen of the United States, residing at Indianapolis, in the county of Marion and State of Indiana, have invented a certain new and useful Improvement in Reciprocating Mechanism, of which the following is a full, clear, concise, and exact description.

My invention relates to reciprocating mechanism employing cylinders and pistons, such for example, as internal combustion hydro-carbon engines, and resides in such a construction of the piston that it may be employed in effecting or promoting the flow of lubricating oil between the engaging surfaces of the piston and the cylinder in which it reciprocates.

In carrying out the invention an exterior circumferentially directed groove is formed upon the cylinder engaging part of the piston and out of the zone of a piston ring groove with which said groove is in communication. Such groove preferably also communicates at intervals with the interior of the piston, which is hollow. By means of this construction lubricating oil may have a course between the cylinder and piston interior, and may be caused to circulate along this course if a splash system or other lubricant circulating system be employed.

In the preferred embodiment of the invention the circumferentially extending groove completely surrounds the piston and and is immediately adjacent the piston ring groove to constitute an enlargement thereof that is unoccupied by the piston ring to be capable of freely receiving the oil and of freely distributing it to the passages that connect the groove with the piston interior.

The invention will be more fully explained in connection with the accompanying drawing in which Fig. 1 is a view showing a portion of a cylinder in longitudinal section and a part of the preferred form of piston that is shown partially in elevation and partially in section; Fig. 2 is a sectional view on line 2—2 of Fig. 1; Fig. 3 is a view, on a larger scale, of a part of the structure as shown in Fig. 1; and Figs. 4 and 5 are sectional views showing modifications of the structure illustrated in Fig. 3.

Like parts are indicated by similar characters of reference throughout the different figures.

The cylinder, of which a portion 1 is shown, may be a part of a reciprocating internal combustion hydro-carbon engine, or a part of any machine in which reciprocating movement is developed with the aid of a cylinder and the piston therein. The piston, of which a part 2 is shown, reciprocates within or with reference to the cylinder. It is formed with suitable exterior circumscribing piston ring receiving grooves 3, 4, 5 in its cylindrical wall 6. Piston rings 7, 8, and 9, of any suitable or plain construction, are disposed in the grooves 3, 4 and 5.

Usually but one of the piston ring receiving grooves, say the innermost groove 5, is extended, in accordance with my invention. In each of the drawings I have illustrated an exterior annular groove 10 in the cylindrical wall of the piston and outside of the zone of the adjacent piston ring receiving groove 5 and preferably beneath the latter groove. The two grooves preferably merge, where adjacent, so that oil may readily pass between them. The piston ring groove extension 10, being unoccupied by a piston ring, is free to receive oil from the cylinder side and to promote its distribution upon the cylinder, and to convey it to the returning passages 11, if such be employed, formed through the piston but to which I no not wish to be limited. In the structure shown in Figs. 1, 2 and 3, the passages 11 are radial and horizontal and lie partially in the zone of the piston ring receiving groove 5 and partially in the zone of the extension 10 of groove 5. In the structure shown in Fig. 4 the passages 11 are oblique but also have communication with the groove 5 and its extension 10. In the structure of Fig. 5 the passage 11 is located wholly within the zone of the groove 10 but is brought directly into communication with the groove 5 independently of groove 10 by a communicating passage 12. The passages 11 thus not only serve to return oil from the groove 10 to the crank case from which it may be dashed upon the cylinder interior, but also serve to convey oil from the corresponding piston receiving groove to the crank case, though the invention is not to be thus limited.

While I have herein shown and particularly described several forms of my invention I do not wish to be limited to the precise details of construction shown as changes may readily be made without departing from the spirit of my invention, but having thus described my invention I claim as new and desire to secure by Letters Patent the following:—

The combination with a cylinder; of a hollow piston therein formed with a piston ring receiving groove; and a piston ring in said groove, said groove having an exterior circumferentially extending extension upon one side of the piston ring, said piston having a passage formed therethrough that has communication with said groove independently of the groove extension and with the groove extension independently of the groove to establish communication between its interior and the piston ring receiving groove and also between said piston interior and the aforesaid groove extension.

In witness whereof, I hereunto subscribe my name this seventeenth day of August A. D., 1922.

DANIEL C. TEETOR.